United States Patent Office 3,261,801
Patented July 19, 1966

3,261,801
REVERSION RESISTANT ORGANOPOLYSILOXANE CONTAINING BARIUM OXIDE OR BARIUM PEROXIDE
Wilbur J. Wormuth, Schenectady, N.Y., assignor to General Electric Company, a corporation of New York
No Drawing. Filed Aug. 22, 1962, Ser. No. 218,520
8 Claims. (Cl. 260—37)

This application is a continuation-in-part of my copending application Serial No. 184,593, filed April 2, 1962, now abandoned.

The present invention relates to organopolysiloxane compositions convertible to the cured, solid, elastic state and to a process for making them. More particularly, the present invention relates to the employment of certain oxides of barium in organopolysiloxane compositions to provide for the production of organopolysiloxane elastomers having improved resistance to reversion.

The unique properties of organopolysiloxane elastomers, such as high temperature stability over wide ranges of temperature are generally recognized by those skilled in the mechanical and electrical arts. In particular applications, however, involving high temperatures under sealed conditions, such as found in O-ring seals and gaskets normally present in aircraft and diesel engines, the advantages ordinarily achieved by employing organopolysiloxane elastomers are not fully realized, due to the peculiar nature of the organopolysiloxane polymer. It has long been known, for example, that when an organopolysiloxane polymer is sealed in a closed system at elevated temperatures, particularly in the presence of water, or water-containing substances such as certain filler materials, a softening of the rubber occurs, commonly referred to as reversion. One explanation for reversion is that a scission reaction or reactions occur in the organopolysiloxane polymer. Reversion of the polymer causes drastic changes in the hardness, tensile, and elongation of the elastomer. In other words, the desirable physical properties generally attributed to organopolysiloxane elastomers are adversely affected. It would be advantageous therefore to be able to effectively utilize organopolysiloxane elastomers under sealed conditions at elevated temperatures without adversely affecting the organopolysiloxane polymer.

It has now been discovered that if certain oxides of barium, preferably barium peroxide, are incorporated into an organopolysiloxane composition convertible to the cured, solid, elastic state, prior to cure, the reversion resistance of the organopolysiloxane elastomer derived therefrom is substantially improved.

The desirable properties of the elastomer, such as its ability to withstand elevated temperatures over extended periods of time not only remains unaffected, but it is found to be actually improved. The valuable results achieved by the present invention were quite unexpected, since the employment of various other metal oxides, such as lead oxide and calcium oxide, in organopolysiloxane compositions has been known to adversely affect the heat-age characteristics of the resulting organopolysiloxane elastomer.

In accordance with the present invention, there is provided organopolysiloxane compositions comprising (1) 100 parts by weight of an organopolysiloxane, (2) 10 to 200 parts of a filler, and (3) from 0.1 to 10 parts, and preferably 0.25 to 5 parts of an oxide of barium selected from barium oxide, BaO, and barium peroxide, BaO$_2$, said organopolysiloxane being convertible to the solid, cured, elastic state and having a viscosity of at least 100,000 centipoises at 25° C., in which the organo radicals of said organopolysiloxane are attached to silicon through silicon-carbon linkages and selected from the class consisting of monovalent hydrocarbon radicals, halogenated monovalent hydrocarbon radicals, and cyanoalkyl radicals, there being an average of about 1.95 to 2.05 organo radicals per silicon atom.

The fillers that can be employed in the present invention to produce the novel improved reversion resistant organopolysiloxane compositions are known to the art as reinforcing, and semi-reinforcing fillers. The reinforcing fillers, such as the silica fillers, including fumed silica, precipitated silica and the like, are structure inducing and depending on their manufacture, can contain or be free of hydroxyl groups either in the form of adsorbed moisture or bonded to silicon atoms. These structure inducing fillers can be modified such as, for example, by the introduction of silicon-bonded alkoxy groups in place of some hydroxyl groups, resulting in some advantages as decreased structure when incorporated with a convertible organopolysiloxane composition.

The preferred silica filler of the present invention is a fumed silica filler made by fuming processes including the vapor phase burning of silicon tetrachloride or ethylsilicate, an example being what is known to the trade as Cab-O-Sil. Since a fumed silica contains a relatively low degree of moisture, it is particularly valuable as a filler additive in electrical applications, requiring a high resistance to reversion. Examples of other silica reinforcing fillers may be found described in U.S. Patents 2,541,137, 2,610,167 and 2,657,149. Such fillers may be slightly acidic or alkaline (that is, have pHs below or above 7) depending upon the method of manufacture, such as by an aerogel process. Examples of semi-reinforcing or usually non-structure forming type, are titanium oxide, lithopone, calcium carbonate, ground quartz, iron oxide, and diatomaceous earth.

The organopolysiloxanes convertible to the cured, solid, elastic state used in connection with this invention can be viscous masses or gummy solids depending upon the state of condensation of the starting organopolysiloxanes, polymerizing agent used, etc. Although these organopolysiloxanes are well known in the art, attention is directed to the organopolysiloxanes disclosed in Agens Patent 2,448,756, Sprung et al. Patent, 2,448,556, Sprung Patent 2,484,595, Krieble et al. Patent 2,457,688, and Marsden Patent 2,521,528, all the foregoing patents being assigned to the same assignee as the present invention. In addition to the aforementioned patents, Hyde Patent 2,490,357 and Warrick Patent 2,541,137 are also included. It will, of course, be understood by those skilled in the art, that the convertible organopolysiloxanes referred to herein contain the same or different silicon-bonded organic substituents (e.g., methyl, ethyl, propyl, vinyl, allyl, phenyl, tolyl, xylyl, benzyl, phenylethyl, naphthyl, chlorophenyl, cyanoethyl, both methyl and phenyl, etc. radicals) connected to the silicon atoms by carbon-silicon linkages, may be employed in the present invention without departing from the scope of this invention.

The particular convertible organopolysiloxanes used are not critical and can be any one of those described in the foregoing patents. They can be viscous masses or gummy solids depending upon the state of condensation of the starting organopolysiloxanes, polymerizing agent, etc., and can be prepared by condensation of a liquid organopolysiloxane containing an average of about 1.95, preferably from about 1.98 to about 2.05 organic groups per silicon atom. The polymerizing agents that can be employed are well known in the art and can include, for instance, ferric chloride hexahydrate, phenyl phosphoryl chloride; alkaline condensing agents such as potassium hydroxide, sodium hydroxide, etc. Each convertible organopolysiloxane generally comprises a polymeric diorganosiloxane which can contain, if desired, for example, up to 2 mole percent copolymerized monoorganosiloxane, for example, copolymerized monomethylsiloxane and a small molar (e.g. less than 1 mole) percent of triorganosiloxy units, e.g., trimethylsiloxy units. Generally, it is preferred to use as the starting liquid organopolysiloxanes (or mixtures of organopolysiloxanes) from which the convertible organopolysiloxanes are prepared, ones which contain about 1.999 to 2.01, inclusive, organic groups, for example, methyl groups per silicon atom, and where preferably more than 50 percent, e.g., more than 75 percent, of the silicon atoms in the polysiloxane contain two silicon-bonded lower alkyl groups. The convertible organopolysiloxane thus prepared also advantageously contains silicon atoms to which at least 50 percent of the hydrogen groups attached thereto are lower alkyl radicals, e.g., methyl radicals.

The starting organopolysiloxanes used to make the convertible organopolysiloxanes advantageously comprise organic constituents consisting essentially of monovalent organic radicals attached to silicon by carbon-silicon linkages, and in which essentially all the siloxane units consist of units of the structural formula $R_2SiO$, where R is preferably a radical of the group consisting of methyl and phenyl radicals. At least 50 to 75 percent of the total number of R groups are preferably methyl radicals. The polysiloxane can be one in which all the siloxane units are $(CH_3)_2SiO$, or the siloxane can be a copolymer of dimethylsiloxane with a minor amount (e.g., from 1 to 20 or more mole percent) of a unit selected from $$C_6H_5(CH_3)SiO$$

$(C_6H_5)_2SiO$ and mixtures thereof. The presence of halogen, e.g., chlorine, atoms on the phenyl nucleus is also within the purview of the present invention.

Where alkenyl groups are attached to silicon by carbon-silicon linkages, it is preferable that the alkenyl groups (for instance, vinyl groups, allyl groups, etc.) be present in an amount equal to from 0.05 to 2 mole percent of the total number of silicon-bonded organic groups in the convertible organopolysiloxane.

Various curing agents to effect more rapid conversion of the convertible organopolysiloxane to the cured, solid, elastic state can be incorporated. Among such curing agents can be mentioned, for instance, benzoyl peroxide, tertiary butyl perbenzoate, bis-(2,4-dichlorobenzoyl) peroxide, etc. These curing agents (or "vulcanization accelerators" as they are often designated) can be present in amounts ranging from about 0.1 to as high as 4 to 8 percent or more, by weight, based on the weight of the convertible organopolysiloxane. High energy electron irradiation without curing agents can also be employed for vulcanizing purposes.

In the practice of the present invention the organopolysiloxane compositions can be made by incorporating the oxide of barium into the organopolysiloxane polymer, along with the filler, curing catalyst and other additives in any desired manner. The incorporation of the oxide of barium into the polymer can be accomplished by adding it directly, or in the form of a masterbatch containing from 1 to 25 parts of the oxide of barium per 50 to 75 parts of polymer. In addition, experience has shown that optimum properties in the final composition are achieved by adding along with the oxide of barium, from 0.5 to 10 parts and preferably about 1 to 2 parts of $Fe_2O_3$ per 100 parts of polymer, as a heat-age additive.

The order of addition of the various ingredients to the organopolysiloxane polymer, utilized in forming the curable organopolysiloxane composition, is not critical. When molding the curable organopolysiloxane composition, pressures from about 100 to 2,000 p.s.i. or more can be employed in combination with temperatures ranging from about 80° C. to 200° C. or higher. Under such conditions, the time required for effecting the conversion of the curable organopolysiloxane composition to the solid, elastic state will depend upon such factors as the type of curing agent, concentration thereof, type of organopolysiloxane, type and amount of filler, etc.

In order that those skilled in the art may be better able to practice the present invention, the following examples are given by way of illustration and not by way of limitation. All parts are by weight.

EXAMPLE 1

A methylvinylpolysiloxane convertible to the cured, solid, elastic state was prepared by heating to a temperature between 110° C. to 155° C. with agitation, over a period of 6 hours, 100 parts of octamethylcyclotetrasiloxane, 0.23 part of tetramethyltetravinylcyclotetrasiloxane and 0.1 part of hexamethyldisiloxane in the presence of 0.001 part, by weight, of potassium hydroxide. The product was a highly viscous benzene soluble mass of only slight flow and had a ratio of approximately 2 methyl radicals per silicon atom.

A mixture of about 100 parts of the above-described methylvinylpolysiloxane and 25 parts of fumed silica was milled on a rubber mill. To the resulting filler-polymer mixture, there was added 1.5 parts of mixture of 2,4-dichlorobenzoyl peroxide in an equal weight of a dimethyl silicone oil, and 0.75 part of barium oxide. Slabs were cut from the resulting organopolysiloxane composition after it was sheeted and press-cured for 10 minutes at 135° C.

In addition to the above composition containing 0.75 part of barium oxide per 100 parts of the methylvinylpolysiloxane polymer, other mixtures were prepared from the methylvinylpolysiloxane following the same procedure containing from 0 part to 10 parts of barium oxide per 100 parts of siloxane polymer. In addition to the above-described methylvinylpolysiloxane polymer, another polydiorganosiloxane polymer was prepared in accordance with the above-described procedure, except that 15 parts of octaphenylcyclotetrasiloxane was added to the mixture of cyclic siloxanes used to prepare the methylvinylpolysiloxane polymer and the resulting mixture was heated for a period of 6 hours. Slabs were also prepared from this polydiorganosiloxane polymer containing methyl, vinyl and phenyl radicals attached to silicon through carbon-silicon linkages by curing a mixture of 100 parts of the polymer, 25 parts of the filler, and 0.75 part of barium oxide with 0.8 part of benzoyl peroxide. Slabs from each of the various press-cured sheets were sealed with a drop of water in a 25 x 99 mm. glass vial. Slabs from the methylvinylpolysiloxane polymer were sealed for 4 hours at 480° F. and slabs from the methylphenylpolysiloxane polymer were sealed for 4 hours at 450° F. to determine their reversion resistance. The various slabs were also tested for *heat-age* by heating them in the open at temperatures between 450° F. to 600° F. over an extended period of time. In instances where the slabs were heated at 600° F. in the open, $Fe_2O_3$ was employed as a heat-age additive at an amount of 2 parts per 100 parts of polymer.

The table below shows the results obtained with the slabs that were heated under sealed conditions and in the open. In the table, "T" stands for tensile (p.s.i.), "E" stands for elongation (percent), and "H" stands for hardness (Shore A), "MeVi" stands for methylvinyl polymer and "MeViPh" stands for methylvinylphenyl polymer, "$Fe_2O_3$" represents the slabs that contained iron oxide, and "reverted" means that the slabs were transformed to liquids or were too weak to test.

Table I

| Polymer | Wgt. Percent BaO | Sealed 4 hrs./480° F. | | | + Fe₂O₃ | | | Open 168 hrs./480° F. | | | 48 hrs./600° F. | | | + Fe₂O₃ | | |
|---|---|---|---|---|---|---|---|---|---|---|---|---|---|---|---|---|
| | | H | T | E | H | T | E | H | T | E | H | T | E | H | T | E |
| MeVi | 0 | (¹) | (¹) | (¹) | (¹) | (¹) | (¹) | 60 | 545 | 120 | Too brittle to test | | | 49 | 510 | 230 |
| Do | 0.25 | 31 | 716 | 530 | | | | | | | ----do---- | | | | | |
| Do | 0.50 | 39 | 635 | 500 | 38 | 745 | 550 | 61 | 530 | 120 | ----do---- | | | 50 | 560 | 230 |
| Do | 0.75 | | | | | | | | | | ----do---- | | | | | |
| Do | 1.0 | 38 | 715 | 510 | 38 | 705 | 540 | 61 | 700 | 120 | ----do---- | | | 53 | 650 | 260 |
| Do | 2.5 | 39 | 655 | 500 | 39 | 735 | 540 | 48 | 630 | 280 | ----do---- | | | 60 | 590 | 210 |
| Do | 5.0 | 38 | 615 | 560 | 38 | 720 | 520 | 45 | 605 | 320 | ----do---- | | | 70 | 670 | 220 |
| Do | 10 | 39 | 595 | 600 | 40 | 575 | 490 | 48 | 625 | 350 | ----do---- | | | 83 | 425 | 70 |

| Polymer | Wgt. Percent BaO | 4 hrs./450° F. | | | | | | | | | 4 hrs./450° F. | | | | | |
|---|---|---|---|---|---|---|---|---|---|---|---|---|---|---|---|---|
| | | H | T | E | | | | | | | H | T | E | | | |
| MeViPh | 0 | 18 | 205 | 445 | | | | | | | | | | | | |
| Do | .75 | 30 | 1,210 | 915 | | | | | | | 36 | 1,560 | 900 | | | |
| | | | | | | | | | | | 36 | 1,500 | 950 | | | |

¹ Reverted.

EXAMPLE 2

A mixture of 100 parts of the methylvinylpolysiloxane utilized in Example 1, and 25 parts of fume silica was milled on a rubber mill. To the resulting mixture there was added 1½ parts of a mixture of 2,4-dichlorobenzoyl peroxide and an equal weight of a dimethylsilicone oil and 0.5 part of barium peroxide. Following the procedure of Example 1, other mixtures of the methylvinylpolysiloxane polymer and filler were prepared. These mixtures were blended with barium peroxide in a proportion of from 0 to 10 parts of barium peroxide per 100 parts of the polymer.

Table II below shows the results obtained with the compositions containing barium peroxide tested in the same manner as the compositions containing barium oxide shown in Table I. The terms shown in Table II are as defined above.

Table II

| Weight Percent BaO₂ | Open—4 hrs./450° F. | | | Sealed—4 hrs./450° F. | | |
|---|---|---|---|---|---|---|
| | H | T | E | H | T | E |
| 0 | 36 | 960 | 600 | (¹) | (¹) | (¹) |
| 0.5 | 38 | 1,095 | 620 | 36 | 445 | 720 |
| 1.0 | 36 | 950 | 520 | 37 | 600 | 750 |
| 2.0 | 36 | 1,070 | 590 | 38 | 615 | 690 |
| 5.0 | 38 | 915 | 530 | 38 | 775 | 630 |
| 10 | 38 | 945 | 500 | 38 | 630 | 720 |

¹ Reverted.

The results shown in Tables I and II above clearly demonstrate that barium oxide and barium peroxide can be utilized in organopolysiloxane compositions convertible to the cured, solid, elastic state to produce improved elastomers having both superior resistance to reversion and improved heatage as compared to the corresponding organopolysiloxane compositions free of either of these oxides of barium. In addition, the data also show that iron oxide, a well known heat-age additive can be successfully utilized in the organopolysiloxane compositions of the invention to provide for the production of organopolysiloxane elastomers having both improved resistance to reversion and superior heat-age. It is to be noted moreover, that even in the absence of iron oxide, compositions made in accordance with the practive of the present invention having a proportion of between about 0.25 part to as high as 10 parts of either barium oxide or barium peroxide can be converted to elastomers having outstanding resistance to high temperatures. As shown by the above results, moreover, the compositions of the present invention can be advantageously employed in applications involving a sealed system, and resist adverse effects of reversion to a greater degree than organopolysiloxane compositions free of the oxides of barium utilized in the practice of the present invention.

While the foregoing examples have of necessity been limited to only a few of the many variables within the scope of the present invention, it should be understood that the present invention covers a much broader class of organopolysiloxane compositions containing an oxide of barium included within the scope of the present invention. All of these various materials are prepared by methods specifically illustrated in the Examples above and described further in the foregoing description of the present invention.

What I claim as new and desire to secure by Letters Patent of the United States is:

1. An organopolysiloxane composition comprising (1) 100 parts, by weight, of an organopolysiloxane, (2) from 10 to 200 parts of a filler, (3) from 0.1 to 10 parts of an oxide of barium selected from the class consisting of barium oxide and barium peroxide, said organopolysiloxane being convertible to the solid, cured, elastic state and having a viscosity of at least 100,000 centipoises at 25° C., in which the organo radicals of said organopolysiloxane being attached to silicon through silicon-carbon linkages and being selected from the class consisting of monovalent hydrocarbon radicals, halogenated monovalent hydrocarbon radicals, and cyanoalkyl radicals, there being an average of about 1.95 to 2.05 organo radicals per silicon atom.

2. A composition in accordance with claim 1, where the oxide of barium is barium oxide.

3. A composition in accordance with claim 1, where the oxide of barium is barium peroxide.

4. A composition in accordance with claim 1, wherein the filler is fume silica.

5. A composition in accordance with claim 1, wherein the organo radicals of the organo-polysiloxane consist essentially of methyl groups.

6. A composition in accordance with claim 1, wherein the oxide of barium is present in the range of from 0.25 to 5 parts based on the weight of the organopolysiloxane.

7. A composition in accordance with claim 1, containing from 1 to 10 parts of Fe₂O₃ per 100 parts of the organopolysiloxane.

8. An organopolysiloxane composition comprising (1) 1 to 25 parts of an oxide of barium selected from the class consisting of barium oxide and barium peroxide and (2) 50 to 75 parts of an organopolysiloxane having a viscosity of at least 100,000 centipoises at 25° C., in which the organo radicals of said organopolysiloxane being attached to silicon through silicon-carbon linkages and being selected from the class consisting of monovalent hydrocarbon radicals, halogenated monovalent hydrocarbon radicals, and cyanoalkyl radicals, there being an average of about 1.95 to 2.05 organo radicals per silicon atom.

References Cited by the Examiner
UNITED STATES PATENTS

| | | | |
|---|---|---|---|
| 2,874,142 | 2/1959 | Hanford | 260—45.7 |
| 2,893,906 | 7/1959 | Taylor | 260—45.75 |
| 2,944,045 | 7/1960 | Canarios | 260—45.75 |
| 3,024,214 | 3/1962 | Fenner | 260—37 |
| 3,026,282 | 3/1962 | Pike | 260—37 |
| 3,061,575 | 10/1962 | Russell | 260—37 |

MORRIS LIEBMAN, *Primary Examiner.*

J. W. BEHRINGER, *Examiner.*

J. H. DERRINGTON, *Assistant Examiner.*